United States Patent
Nguyen et al.

(10) Patent No.: US 9,181,470 B2
(45) Date of Patent: Nov. 10, 2015

(54) ELECTRORHEOLOGICAL OR MAGNETORHEOLOGICAL COMPOSITIONS FOR TREATMENT OF SUBTERRANEAN FORMATIONS AND METHODS OF USING THE SAME

(71) Applicant: Halliburton Energy Services, Inc., Houston, TX (US)

(72) Inventors: Philip D. Nguyen, Houston, TX (US); James William Ogle, Spring, TX (US); Ali Alwattari, Humble, TX (US); Loan K Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 341 days.

(21) Appl. No.: 13/765,759

(22) Filed: Feb. 13, 2013

(65) Prior Publication Data
US 2014/0224480 A1    Aug. 14, 2014

(51) Int. Cl.
*E21B 43/26* (2006.01)
*E21B 43/267* (2006.01)
*C09K 8/62* (2006.01)
*C09K 8/80* (2006.01)

(52) U.S. Cl.
CPC ... *C09K 8/80* (2013.01); *C09K 8/62* (2013.01); *C09K 8/805* (2013.01); *E21B 43/26* (2013.01)

(58) Field of Classification Search
CPC ............ C09K 8/80; C09K 8/62; E21B 43/26; E21B 43/267; H01F 1/447
See application file for complete search history.

(56) References Cited

U.S. PATENT DOCUMENTS

| | | | |
|---|---|---|---|
| 6,984,343 B1 | 1/2006 | Wen et al. | |
| 7,398,680 B2 * | 7/2008 | Glasbergen et al. | 73/152.12 |
| 2003/0089596 A1 | 5/2003 | Tao et al. | |
| 2007/0043306 A1 | 2/2007 | Olson | |
| 2011/0048713 A1 * | 3/2011 | Lewis et al. | 166/292 |
| 2011/0114190 A1 | 5/2011 | Wen et al. | |
| 2011/0127042 A1 * | 6/2011 | Ocalan et al. | 166/373 |
| 2012/0256135 A1 | 10/2012 | Green et al. | |

* cited by examiner

*Primary Examiner* — Catherine Loikith
(74) *Attorney, Agent, or Firm* — Schwegman Lundberg & Woessner, P.A.; Craig W. Roddy (57) ABSTRACT

The present invention relates to compositions for the treatment of subterranean formations, and methods of using the same. In various embodiments, the present invention provides a fluid for treatment of a subterranean formation, wherein the fluid is at least one of electrorheological and magnetorheological. Various embodiments also provide methods of using the electrorheological or magnetorheological fluid in a subterranean formation, including for fracturing, deposition of proppants, and combinations thereof.

27 Claims, 1 Drawing Sheet

ELECTRORHEOLOGICAL OR MAGNETORHEOLOGICAL COMPOSITIONS FOR TREATMENT OF SUBTERRANEAN FORMATIONS AND METHODS OF USING THE SAME

BACKGROUND OF THE INVENTION

Hydraulic fracturing is the propagation of fractures in a subterranean material such as rock by the use of a pressurized fluid. Induced hydraulic fracturing, or fracking, is a technique used to release petroleum, natural gas, or other substances for extraction from reservoir subterranean formations via a wellbore. The viscosity of the fluid used to perform the fracturing can alter the types of fractures formed in the subterranean formation. High-viscosity fluids are harder to pump to the fracturing site and more difficult to recover, but generally form large dominant fractures. Lower-viscosity fluids are easier to pump to the fracturing site and easier to recover, but generate cause smaller distributed fractures.

A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. However, lower-viscosity fluids are less likely to dislodge proppants during recovery of the fluid.

SUMMARY OF THE INVENTION

In various embodiments, the present invention provides a method of treating a subterranean formation. The method includes obtaining or providing a fluid that is electrorheological, magnetorheological, or a combination thereof. The method also includes contacting downhole a subterranean material and the electrorheological or magnetorheological fluid.

In various embodiments, the present invention provides a method of fracturing a subterranean material. The method includes obtaining or providing a fluid that is electrorheological, magnetorheological, or a combination thereof. The method includes contacting downhole a subterranean material and the electrorheological or magnetorheological fluid. The method also includes fracturing at least part of the subterranean material using the electrorheological or magnetorheological fluid. Before or during the fracturing, the viscosity, yield shear strength, or combination thereof of the electrorheological or magnetorheological fluid is increased downhole proximate the at least part of the subterranean material using an electric field, a magnetic field, or a combination thereof.

In various embodiments, the present invention provides a method of depositing a payload material into a subterranean fracture. The method includes obtaining or providing a fluid that is electrorheological, magnetorheological, or a combination thereof. The method includes contacting downhole a subterranean material and the electrorheological or magnetorheological fluid. The fluid includes a payload material. The payload material includes at least one of a proppant, a resin-coated proppant, and an encapsulated resin. The method includes using the electrorheological or magnetorheological fluid to deposit at least part of the payload material downhole in a subterranean fracture. Before or during the depositing, the viscosity, yield shear strength, or combination thereof of the electrorheological or magnetorheological fluid is increased downhole proximate the subterranean fracture using an electric field, a magnetic field, or a combination thereof. The method also includes recovering at least part of the electrorheological or magnetorheological fluid used for the depositing of the payload material. Before or during the recovering, the viscosity, yield shear strength, or combination thereof of the electrorheological or magnetorheological fluid is decreased downhole in at least one location by decreasing the intensity of the electric field, magnetic field, or combination thereof.

In various embodiments, the present invention provides a method of curing a curable material on a subterranean material. The method includes obtaining or providing a fluid that is electrorheological, magnetorheological, or a combination thereof. The method includes contacting downhole a subterranean material and the electrorheological or magnetorheological fluid. The subterranean material includes a curable material. The method includes curing the curable material while increasing the viscosity, yield shear strength, or combination thereof of the electrorheological or magnetorheological fluid before or during the contacting using an electric field, a magnetic field, or a combination thereof.

In various embodiments, the present invention provides a method of treating a subterranean formation. The method includes obtaining or providing a main borehole. The method includes forming a secondary borehole that is a lateral borehole and begins downhole in the main borehole, wherein in at least one downhole location the secondary borehole is proximate to both the main borehole and a production zone. The method includes placing at least one electrode in the main borehole at a location proximate the production zone, and placing at least one electrode in the secondary borehole at a location proximate the production zone. The method includes obtaining or providing a first fluid that is electrorheological, magnetorheological, or a combination thereof. The method includes fracturing at least part of the subterranean material using the first electrorheological or magnetorheological fluid to form at least one subterranean fracture. Before or during the fracturing, the viscosity, yield shear strength, or combination thereof of the first electrorheological or magnetorheological fluid is increased downhole proximate the at least part of the subterranean material using at least a first electric field generated by the at least two electrodes. The method includes obtaining or providing a second fluid that is electrorheological, magnetorheological, or a combination thereof. In some examples, the second fluid may have the same or substantially the same fluid composition as the first fluid. The second fluid includes a payload material including at least one of a proppant, a resin-coated proppant, and an encapsulated resin. The method includes using the second fluid to deposit at least part of the payload material downhole in the subterranean fracture. Before or during the depositing, the viscosity, yield shear strength, or combination thereof of the electrorheological or magnetorheological fluid is increased downhole proximate the subterranean fracture using at least a second electric field generated by the at least two electrodes. The method includes recovering at least part of the first or second fluid. Before or during the recovering, the viscosity, yield shear strength, or combination thereof of the electrorheological or magnetorheological fluid is decreased downhole in at least one location by decreasing at least the second electric field generated by the at least two electrodes.

In various embodiments, the present invention provides a composition for treatment of a subterranean formation. The composition includes an electrorheological or magnetorheological fluid. The fluid includes a proppant, a resin-coated proppant, an encapsulated resin, or a combination thereof.

Various embodiments of the present invention have certain advantages over other compositions for treatment of a subterranean formation and methods of using the same, at least some of which are unexpected. Various examples of the present invention provides methods and compositions for enhancing transport properties of fracturing fluid, and thus can improve the fracturing treatment and the production performance of the fractured well. Certain embodiments of the present invention enable control of the viscosity of a fluid used for subterranean operations, for example fracturing or deposition of proppants, enabling the use of a higher- or lower-viscosity fluid when or where it is advantageous to do so by adjusting the strength of an electrical or magnetic field. In various examples, embodiments allow for high degrees of control over the amount and location of the viscosity variation within the fluid in a subterranean formation. In some embodiments, a fracturing fluid can have a lower-viscosity during transportation to a subterranean material in a downhole location, and can have a higher viscosity during the fracturing operation. In some embodiments, the viscosity of a fracturing fluid can be adjusted during a fracturing operation, allowing for a desired distribution of larger more dominant fractures and smaller more distributed fractures. In various examples, the viscosity of a fracturing fluid can be reduced after fracturing to allow for easier and more complete recovery. In certain embodiments, the viscosity of a fluid used for treatment of a subterranean formation can be increased during the deposition of proppants into a fracture, allowing for deeper and more effective placement of the proppants. In various examples, the viscosity of a fluid used to deposit proppants in a fracture can be decreased after the proppants are in a desired location, allowing for easier and more complete recovery of the fluid.

By allowing for more complete recovery of a fracturing fluid or a fluid used to deposit proppants, various embodiments can enable more efficient production of material from a production zone, and can enable the production of less contaminated material. By enabling control of the viscosity of a fracturing fluid during the fracturing process, various embodiments allow for higher degrees of control over the types of fractures formed, enabling more efficient production of material from a production zone. By enabling a higher degree of penetration of proppants into a subterranean fracture, various embodiments can enable more efficient production of material from a production zone. In various examples, a fluid for treatment of a subterranean formation can have a lower viscosity during pumping downhole or during recovery, but a higher viscosity in a desired downhole location, thereby allowing the more efficient performance of applications that require a higher-viscosity material downhole. In some embodiments, reduction of viscosity during recovery can allow more facile reclaimation or re-use of the fluid. In certain embodiments, a magnetorheological or electrorheological fluid used for treatment of a subterranean formation can unexpectedly respond to electrical fields or magnetic fields more readily or with a higher degree of response when downhole due to for example higher pressures experienced downhole. In some examples, the use of the magnetorheological or electrorheological fluid of the present location for treatment of a subterranean formation can avoid or reduce the use of additives such as polymer gels, cross-linkers, breakers, and biocides. In some embodiments, the magnetorheological or electrorheological fluid can give greater wetting, entry, or flowability in subterranean formations in combination with less or no surfactant as compared to other subterranean treatment fluids.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "cure" as used herein refers to exposing to radiation in any form, heating, or allowing to undergo a physical or chemical reaction that results in hardening or an increase in viscosity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "polymer" as used herein refers to a molecule having at least one repeating unit.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "subterranean material" or "subterranean formation" refers to any material under the surface of the earth, including under the surface of the bottom of the ocean. For example, a subterranean material can be any section of a wellbore, including any materials placed into the wellbore such as cement, casings, tubing, drill shafts, liners, bottom-hole assemblies, or screens. In some examples, a subterranean material can be any section of underground that can produce liquid or gaseous petroleum materials or water.

As used herein, the term "yield shear strength" refers to the shear stress of a material at which the material begins to deform plastically. The shear stress is the component of stress coplanar with a material cross section, and can be calculated as the force applied divided by the cross-sectional area of material with area parallel to the applied force vector.

Electrorheological Fluids

Electrorheological (ER) fluids are fluids that change apparent viscosity or yield shear strength in response to an electric field. ER fluids include a suspension of non-conducting particles in an electrically-insulating fluid. In some examples, the ER fluid can go from the consistency of a liquid to that of a solid, semi-solid, or gel with a response time on the order of milliseconds. The non-conducting particles and electrically-insulating fluid can be any suitable substantially non-conducting particles and substantially electrically-insulating materials, such that the fluid exhibits a change in apparent viscosity or yield shear strength in response to an electric field.

In various examples, the non-conducting particles can include polymers, liquid crystal polymers, polysiloxanes, minerals, polyelectrolytes, nanoparticles, ceramics, or combinations thereof. In some examples, the non-conducting particles can include a block copolymer (such as those described in Yavuz et al., *Turk. J. Chem.* 25 (2001) 19-32), silica, glasses, alumina, titanium oxide, bismuth titanate, barium titanate (such as $Ba_4Ti_3O_{12}$ or $BaTiO_3$), strontium titanate, or lead magnesium niobate, such as described in Randall et al., in *Electrorheological Fluids* (eds Tao, R. & Roy, G. D.) 60-66 (Word Scientific, Singapore, 1994). In some embodiments, the particles can have one or more coatings, such as a double coat including a conducting inner layer and an insulating high dielectric constant outer layer. Double coatings are described in, for example, Tam et al., *Phys. Rev. Let.* 78(15), 14 Apr. 1997, 2987-2990. In various examples, the non-conducting particles can have an average diameter of about 0.01-1000 µm, 0.1-500 µm, 1-100 µm, or about 1-50 µm. In various embodiments, the non-conducting particles can be 0.001-60 wt %, 0.01-30 wt %, 0.1-10 wt %, or about 0.5-3% wt % of the ER fluid.

In various examples, the electrically-insulating fluid can be a pump oil, a silicone oil, a mineral oil, a paraffin oil, a chlorinated paraffin oil, a hydrocarbon oil, or an engine oil. In some examples, the electrically insulating fluid can have a viscosity of about 0.01 to 100,000 cP, 0.1 to 10,000 cP, 1 to 1000 cP, or about 10 to 200 cP, measured at about room temperature. In some examples, the ER fluid with no exposure to an electrical field can have a viscosity substantially the same as the viscosity of the electrically insulating fluid.

In some examples, the ER fluid can further include suspended particles of an organic polymeric material that can enhance the ER properties of the ER fluid, such as a polymerized alkene-containing compound such as polystyrene. In some examples, the suspended particles of organic polymeric material can have an average diameter of about 0.01-1000 µm, or about 1-500 µm. In some examples, the ER fluid can include about 1-75 wt %, 5-50 wt %, or about 5-30 wt % of the suspended particles of the organic material.

In various examples, the ER fluid can experience a change in yield shear strength upon exposure to a DC or AC electric field of about 1 V/mm-10,000,000 V/mm, 500 V/mm-1,000,000 V/mm, or about 1000 V/mm-10,000 V/mm. In various examples, the average change in yield shear strength or viscosity per change in the DC or AC electric field can be approximately linear, non-linear, or a combination thereof. In some embodiments, the average change in yield shear strength or viscosity can be approximately linear with respect to the change in the DC or AC electric field until a maximum yield shear strength is approached, at which point the relationship can become non-linear; in other embodiments, the relationship can be approximately linear or non-linear throughout. In some examples, the average change in viscosity per change in the DC or AC electric field can be about 0.001-1,000,000 cP per 1 V/mm, or about 0.1-100,000 cP per 1 V/mm, or about 1-1000 cP per 1 V/mm. In some examples, the average change in yield shear strength per change in the DC or AC electric field can be about 0.001-1,000,000 Pa per 1 V/mm, or about 0.1-100,000 Pa per 1 V/mm, or about 1-1000 Pa per 1 V/mm, or about 50-100 Pa per 1 V/mm. In some embodiments, the ER fluid can have a maximum yield shear strength or maximum viscosity; in other embodiments, there is no maximum yield shear strength or viscosity. In various embodiments, the ER fluid can have a maximum yield shear strength of about 0.001 kPa, 0.01 kPa, 0.1 kPa, 1 kPa, 2 kPa, 3 kPa, 4 kPa, 5 kPa, 10 kPa, 20 kPa, 30 kPa, 40 kPa, 50 kPa, 75 kPa, 100 kPa, 150 kPa, 200 kPa, 300 kPa, 400 kPa, 500 kPa, 750 kPa, 1000 kPa, 10,000 kPa, 100,000 kPa, or about 1,000,000 kPa or more. In various embodiments, the ER fluid can have a maximum viscosity at about room temperature of about 0.01 cP, 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, 500,000,000 cP, or about 1,000,000,000 cP or more.

In various embodiments, the ER fluid can be any ER fluid described in U.S. Patent Publication No. 2012/0256135. In some examples, ER fluid can include an amphiphile in oil. The amphiphile can be a sulfonated siloxane cage compound. The amphiphile can be a polyhedral oligomeric silsesquioxane substituted with at least one polar group, wherein the amphiphile has a permanent dipole. In some examples, the ER fluid is a polyhedral oligomeric silsesquioxane substituted with a single tosyloxypropyl group, with one to eight carbonyl groups, or with one to eight sulfonic acid groups. For example, the amphiphile can be an amphiphilic polyhedral oligomeric silsesquioxane, such as a sulfonated polyhedral oligomeric silsesquioxane (sPOSS). In some examples, the sPOSS has the structure wherein each R is independently a $(C_1-C_{20})$alkyl group. The variable R can be methyl, ethyl, propyl, butyl, or isobutyl. In some example, R can be ethyl or isobutyl. The oil can be a silicone oil, a mineral oil, a paraffin oil, or a viscous hydrocarbon. In some examples, the oil is a polydimethylsiloxane. In some examples, the ER can further include suspended particles of an organic polymeric material that can enhance the ER properties of the ER fluid, and in some examples, the suspended particles of the organic material can be present in the ER fluid in a higher wt % than the amphiphile. The ER fluid can include about 0.1% (v/v) to 60% (v/v), 1% (v/v) to 30% (v/v), or about 5% (v/v) to 20% (v/v) of the cage compound. In some examples, the ER fluid can include about 0.01-30 wt %, 0.1-10 wt %, or about 0.5-3% of the cage compound and about 1-75 wt %, 5-50 wt %, or about 5-30 wt % of the suspended particles of the organic material. In some example, the particles of the cage compound can have an average diameter of about 0.01-1000 µm, or about 1-100 µm In various embodiments, the ER fluid can be any ER fluid described in U.S. Pat. No. 6,984,343, or in Wen et al. "The Giant Electrorheological Effect in Suspensions of Nanoparticles," *Nature Materials* 2, 2003, 727-730. For example, the ER fluid can include nanoparticles that include an inorganic core that includes $TiO_2$ or an amorphous salt of the form $M1_xM2_{2-2x}TiO(C_2O_4)_2$, where M1 is selected from the group consisting of Ba, Sr and Ca and M2 is selected from the group consisting of Rb, Li, Na and K. The nanoparticles can be coated with a polar compound. The fluid can include an electrically insulating hydrophobic liquid. The polar compound can have a molecular dipole of greater than 1.9 Debye. The polar compound can be acetamide, urea or thiourea. The fluid can include about 1 to 80 wt %, or about 5 to 30 wt % of the coated nanoparticles. The hydrophobic liquid can have a volume fraction of about 0.1% to 80%, 0.5% to 50%, or 1% to 35%, or about 10% to 35%. The hydrophobic liquid can be an oil, for example, a silicone oil, a mineral oil, an engine oil, a hydrocarbon oil, or a combination thereof. The oil can have a viscosity of 1 to 1000 cP or about 10 to 200 cP. The viscosity of the ER fluid can be changed by applying a DC or AC electric field with a frequency of about 0.001 Hz to 1000 MHz or more, or about 0.1 Hz to 10 kHz. The ER fluid can include a long chain polymer, which can preserve the yield stress at high shear rates or can prevent dripping of the ER fluid. The long chain polymer can be, for example, a polymerized alkene-containing organic compound, such as poly(methyl methacrylate).

Magnetorheological Fluids

Magnetorheological (MR) fluids are fluids that change apparent viscosity in response to a magnetic field. MR fluids include a suspension of magnetizable particles in a carrier liquid or fluid. In some examples, the MR fluid can go from the consistency of a liquid to that of a solid, semi-solid, or gel with a response time on the order of milliseconds. In some examples, the magnetizable particles and the carrier liquid can be any substantially magnetizable particles and carrier liquid, such that the fluid exhibits a change in apparent viscosity or yield shear strength in response to an electric field. The MR fluid can include any suitable additional material. In some examples, the MR fluid includes anti-settling agents that aid in keeping the magnetizable particles suspended in the carrier liquid, such as thixotropic agents, surfactants, dispersants, thickeners, rheology modifiers, or anti-wear agents.

In various examples, the magnetizable particles can include any magnetizable solid material, such as paramagnetic, superparamagnetic, ferrimagnetic, and ferromagnetic materials. Examples of magnetizable materials include pure metals, metal alloys, metal compounds, and any magnetically soft material. Additional examples of magnetizable materials can include iron; nickel; cobalt; alloys of Fe, Ni, or Co; iron oxide; gamma iron oxide; iron cobalt alloys, iron nickel alloys, iron silicon alloys, iron carbide, steel of carbon content lower than 1%, alloys of iron with aluminum, silicon, cobalt, nickel, vanadium, molybdenum, chromium, tungsten and manganesevarious ferrites, including ferrites of Co, Fe, Mg, Mn, Ni or Zn, or combinations thereof, manganese zinc ferrites and zinc nickel ferrites; chrome oxide, iron nitride; vanadium alloys, tungsten alloys, copper alloys, manganese alloys; magnetic oxides of chromium and iron, such as chromium dioxide, gamma-$Fe_2O_3$ and $Fe_3O_4$; any other suitable magnetizable material; and combinations thereof. In various examples, the magnetizable particles can have an average diameter of about 0.001-10,000 µm, 0.01-1000 µm, 0.1-100 µm, or about 1-20 µm. In various examples, the size distribution of the magnetizable particles can be monomodal; in other examples, the size distribution of the magnetizable particles can be bimodal or polymodal, with each average diameter of each grouping of particle sizes being between about 0.001-10,000 µm and being present in any suitable proportion. In various embodiments, the magnetizable particles can be about 0.1-99.9 wt %, 10-95 wt %, 25-90 wt %, or about 50-90 wt % of the MR fluid.

In various examples, the carrier liquid can be a mineral oil, a hydrocarbon oil, water, a silicone oil, an esterified fatty acid, an organic liquid, a solvent, or a combination thereof. In some examples, the carrier liquid can have a viscosity of about 0.01 to 100,000 cP, 0.1 to 10,000 cP, 1 to 1000 cP, or about 10 to 200 cP, measured at about room temperature. In some examples, the MR fluid with no exposure to a magnetic field can have a viscosity substantially the same as the viscosity of the magnetically insulating fluid. In some examples, the carrier liquid can be about 0.1-99.9 wt %, 0.5-80 wt %, 1-50 wt %, 10-50 wt %, or about 1-20 wt % of the MR fluid.

In some examples, the MR fluid can include a surfactant to aid in keeping the magnetizable particles suspended in the carrier liquid. The surfactant can be any suitable surfactant, for example, oleic acid, tetramethylammonium hydroxide, citric acid, soy lecithin, or a combination thereof. In some examples, at least some of the magnetizable particles can be coated by surfactant. The surfactant can be present in any suitable amount, such as less than about 1 wt % of the MR fluid, or less than about 0.1 wt % of the MR fluid.

In some examples, the MR fluid can include a thixotropic agent to aid in keeping the magnetizable particles suspended in the carrier liquid. In some examples, the thixotropic agent is fumed or precipitated silica. The thixotropic agent can be present in any suitable amount, such as less than about 10 wt % of the MR fluid, less than about 1 wt %, or less than about 0.1 wt % of the MR fluid.

In some examples, the MR fluid can further include suspended particles of an organic polymeric material that can enhance the MR properties of the MR fluid, such as a polymerized alkene-containing compound such as polystyrene. In some examples, the suspended particles of organic polymeric material can have an average diameter of about 0.01-1000 µm, or about 1-500 µm. In some examples, the MR fluid can include about 1-75 wt %, 5-50 wt %, or about 5-30 wt % of the suspended particles of the organic material.

In various examples, the MR fluid can experience a change in yield shear strength upon exposure to a magnetic field of about 0.01 kA/m-100,000 kA/m, 0.1 kA/m-1,000 kA/m, or about 1 kA/m-1000 kA/m. In various examples, the average change in yield shear strength or viscosity per change in the magnetic field can be approximately linear, non-linear, or a combination thereof. In some embodiments, the average change in yield shear strength or viscosity is approached, at which point the relationship can become non-linear; in other embodiments, the relationship can be approximately linear or non-linear throughout. In some examples, the average change in viscosity per change in the magnetic field can be about 0.001-1,000,000 cP per 1 kA/m, or about 0.1-100,000 cP per 1 kA/m, or about 1-1000 cP per 1 kA/m. In some examples, the average change in yield shear strength per change in the magnetic field can be about 0.001-1,000,000 Pa per 1 kA/m, or about 0.1-100,000 Pa per 1 kA/m, or about 1-1000 Pa per 1 kA/m, or about 50-600 Pa per 1 kA/m. In some embodiments, the MR fluid can have a maximum yield shear strength or viscosity; in other embodiments, the MR fluid can have no maximum yield shear strength or viscosity. In various embodiments, the MR fluid can have a maximum yield shear strength of about 0.001 kPa, 0.01 kPa, 0.1 kPa, 1 kPa, 2 kPa, 3 kPa, 4 kPa, 5 kPa, 10 kPa, 20 kPa, 30 kPa, 40 kPa, 50 kPa, 75 kPa, 100 kPa, 150 kPa, 200 kPa, 300 kPa, 400 kPa, 500 kPa, 750 kPa, 1000 kPa, 10,000 kPa, 100,000 kPa, or about 1,000,000 kPa or more. In various embodiments, the MR fluid can have a maximum viscosity at about room temperature of about 0.01 cP, 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, 500,000,000 cP, or about 1,000,000,000 cP or more.

Method of Treating a Subterranean Formation

Various embodiments of the present invention provide a method of treating a subterranean formation. The method can include obtaining or providing a fluid that is electrorheological (ER), magnetorheological (MR), or a combination thereof. The method also includes contacting downhole a subterranean material and the ER or MR fluid. The fluid can be either ER, MR, or both ER and MR. The fluid can be any suitable fluid. Aside from the materials that give the fluid its ER or MR properties, the fluid can include any other suitable component, such as suitable liquid or solid components, so long as the fluid still has ER or MR properties. The suitable liquid or solid component can be present in any suitable form, for example, as a suspended solid, a settled solid, a suspended liquid (e.g. an emulsion), a suspending liquid (e.g., an emulsion), or a dispersed or dissolved liquid.

The downhole contacting of the fluid with the subterranean formation can be any suitable contacting. In some examples, the contacting can include contacting subterranean material that is in or proximate to a production zone. In some examples, the method of treating the subterranean formation is a method of fracturing, depositing proppant, curing a curable material, or any combination thereof.

Controlling the Yield Shear Strength or Viscosity

The viscosity or yield shear strength of embodiments of the ER or MR fluid for treatment of a subterranean formation can be controlled downhole by using an electrical field, a magnetic field, or a combination thereof. The electrical or magnetic field can be generated in any suitable manner. In some embodiments, the viscosity of the fluid can be changed without substantially changing the yield shear strength. In some examples, the yield shear strength can be changed without substantially changing the viscosity. In certain examples, both the viscosity and the yield shear strength of the fluid can be changed in any suitable proportion.

In some examples, the fluid is at least ER, and the method includes placing at least two electrodes downhole. The at least two electrodes can be placed in any suitable location, such that an electrical field can be generated in the location in which the viscosity of the fluid having ER properties or both ER and MR properties is desired to be controlled, such as in or proximate a production zone. In some examples, both of the electrodes are in a main borehole. In some examples, both of the electrodes are in a secondary borehole, either drilled from the surface or a lateral borehole drilled from the main shaft. In another example, one electrode is in a main borehole, and another electrode is in a secondary borehole. In some examples, both electrodes are located in the same production zone; in other examples, one electrode is located in a production zone and the other electrode is located outside of the production zone or within another production zone; in some examples, neither electrode is located in the production zone but at least one electrode is proximate to the production zone. The electrodes are suitably proximate one another and to the subterranean location in which the viscosity or yield shear strength of the fluid is desired to be controlled; in some embodiments, the viscosity or yield shear strength of the fluid is controlled at the location of the treatment of the subterranean material, at a different subterranean location than the location of the treatment of the subterranean material, or any combination thereof. In various embodiments the methods of the present invention can include applying a potential across the at least two electrodes to alter the viscosity, yield shear strength, or combination thereof of the fluid downhole in at least one location. The electrodes can have any suitable orientation with respect to one another. The electrodes can be parallel to one another, perpendicular to one another, or any suitable angle therebetween. In various examples, the potential applied across the at least two electrodes generates an electric field at the location where the viscosity, yield shear strength, or combination thereof of the fluid is altered of any suitable strength, such as about 1 V/mm-10,000,000 V/mm, 500 V/mm-1,000,000 V/mm, or about 1000-10,000 V/mm. In some embodiments, a plurality of positive electrodes can be used, a plurality of negative electrodes can be used, or any combination thereof.

In some examples, the fluid is at least MR, and the method includes placing at least one electromagnet downhole. The at least one electromagnet can be placed in any suitable location, such that the magnetic field can be generated in the location in which the viscosity or the fluid having MR properties or both MR and ER properties is desired to be controlled, such as in or proximate a production zone. In some examples, the electromagnet is in a main wellbore. In some examples, the electromagnet is in a secondary borehole, either drilled from the surface or a lateral borehore drilled from the main shaft. In another example, multiple electromagnets are used, with at least one electromagnet in the main borehole, and the other electromagnet is in a secondary borehole. In some examples including multiple electromagnets, both electromagnets are located in the same production zone; in other examples, one electromagnet is located in a production zone and the other electromagnet is located outside of the production zone or within another production zone; in some examples neither electromagnet is located in a production zone but at least one electromagnet is proximate a production zone. The electromagnets are suitably proximate the subterranean location in which the viscosity or yield shear strength of the fluid is desired to be controlled; in some embodiments, the viscosity or yield shear strength of the fluid is controlled at the location of the treatment of the subterranean material, at a different subterranean location than the location of the treatment of the subterranean material, or any combination thereof. In various embodiments the method of the present invention can include applying an electric current to the at least one electromagnet to alter the viscosity, yield shear strength, or combination thereof of the fluid downhole in at least one location. In various examples, the current applied to the electromagnet generates a magnetic field at the location where the viscosity, yield shear strength, or combination thereof of the fluid is altered of any suitable strength, such as about 0.01 kA/m-100,000 kA/m, 0.1 kA/m-1,000 kA/m, or about 1 kA/m-1000 kA/m.

Embodiments of the present invention encompass fluids that exhibit a combination of ER and MR behavior, in any suitable proportion. In some examples, both an electrical field and a magnetic field can be formed downhole, in any suitable proportion, to control the viscosity of the fluid downhole in a desired location. An electromagnet can produce a magnetic field and an electrical field, and in some embodiments can be used to control the viscosity of a liquid having ER properties analogously to the methods of controlling the viscosity of a liquid having MR properties as described herein.

Multiple Boreholes

Methods of the present invention can include contacting downhole a subterranean material and the ER or MR fluid. The downhole area can include a main borehole. The main borehole can contact or be proximate to at least one production zone in at least one location. The parts of the borehole contacting or proximate to the production zone can be horizontal, vertical, or any suitable angle therebetween. In some examples, the method includes forming the main borehole; in other examples, the main borehole is already formed.

The method can include forming a secondary borehole. The secondary borehole can begin at the surface, or the secondary borehole can be a lateral borehole that begins downhole in the main borehole. The secondary borehole can contact or be proximate to at least one production zone in at least one location. The parts of the secondary borehole contacting or proximate to the production zone can be horizontal, vertical, or any suitable angle therebetween. In some examples in at least one downhole location the secondary borehole is proximate both the main borehole and a production zone. In some examples, the method includes forming the secondary borehole; in other examples, the secondary borehole is already formed. At least one of the main borehole and the secondary borehole can be in the production zone. In some examples, both of the main borehole and the secondary borehole are in the production zone. In some examples, in the at least one downhole location wherein the secondary borehole is proximate both the main borehole and the production zone, the secondary borehole is substantially parallel to the main borehole. In certain examples, in the at least one downhole location wherein the secondary borehole is proximate both the main borehole and the production zone, the secondary borehole is substantially perpendicular to the main borehole, or has any suitable orientation between parallel and perpendicular.

In some embodiments, both the main wellbore and the secondary wellbore are at least partially or fully cased. In other embodiments, the main wellbore is at least partially or fully cased, while the secondary wellbore remains uncased. In another example, none of the main wellbore or the secondary wellbore are cased.

Method of Fracturing

In various embodiments, the present invention includes fracturing at least part of the subterranean material contacted with the ER or MR fluid. The ER or MR fluid can be used to perform at least part of the fracturing. Before or during the fracturing, the viscosity, yield shear strength, or combination thereof of the ER or MR fluid can be increased downhole in at least one location using an electric field, a magnetic field, or a combination thereof. In some embodiments, the viscosity or yield shear strength of the ER or MR fluid is increased before or during the fracturing operation to increase the proportion of deep and dominant fractures.

After the fracturing operation, the method can include recovering at least part of the ER or MR fluid. The ER or MR fluid recovered can be fluid used for the fracturing operation. Before or during the recovering of the ER or MR fluid, the viscosity, yield shear strength, or combination thereof of the ER or MR fluid can be decreased downhole in at least one location by decreasing the intensity of the electric field, magnetic field, or combination thereof. By decreasing the viscosity or yield shear strength of the ER or MR fluid, recovery of the fluid can be easier (e.g., easier to pump out) and more complete.

In some embodiments, the ER or MR fluid used to perform at least part of the fracturing operation includes a proppant, a resin-coated proppant, an encapsulated resin, or a combination thereof. The fracturing method can also be a method of delivering the proppant or resin to the subterranean formation, such as to the fractures formed in the subterranean formation during the fracturing.

Method of Delivering a Payload

In various embodiments, the present invention provides a method of depositing downhole at least part of a payload material in a subterranean formation. The payload can be deposited in any suitable downhole location. The method can include depositing a payload material into a subterranean fracture. The subterranean fracture can be any subterranean fracture. In some embodiments, the method includes forming the subterranean fracture; in other embodiments, the subterranean fracture is already formed. Some embodiments include forming or enlarging the subterranean fracture using ER or MR fluid. Certain examples include forming the subterranean fracture and delivering the payload using the same or at least partially the same ER or MR fluid; other examples include forming the subterranean fracture using a different ER or MR fluid as used to deliver the payload, or using a non-ER or non-MR fluid to perform the fracturing.

The payload material can be any suitable payload material. In some examples, the payload material can be a suspended solid, a settled solid, a suspended liquid (e.g. an emulsion), a suspending liquid (e.g., an emulsion), or a dispersed or dissolved liquid. Examples of payloads can include a proppant, a resin-coated proppant, an encapsulated resin, a curable material, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof. In some embodiments, the payload material can be a proppant, a resin-coated proppant, or an encapsulated resin.

Before or during the depositing, the viscosity, yield shear strength, or combination thereof of the ER or MR fluid can be increased downhole in at least one location using an electric field, a magnetic field, or a combination thereof. During or after the depositing, the viscosity, yield shear strength, or combination thereof of the ER or MR fluid can be decreased downhole in at least one location by decreasing the intensity of the electric field, magnetic field, or combination thereof.

Some embodiments include, after the depositing of the payload material, recovering at least part of the ER or MR fluid used for the depositing of the payload material. Before or during the recovering, the viscosity, yield shear strength, or combination thereof of the ER or MR fluid can be decreased downhole in at least one location by decreasing the intensity of the electric field, magnetic field, or combination thereof.

Various embodiments include one or more materials in the ER or MR fluid that are not intended to be a payloads, such as materials that are not intended to be deposited downhole or that are only intended to be deposited downhole in a small proportion, but that form a component of the fluid for other reasons. For example, non-payload materials can include water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

A proppant can be any suitable proppant material. In some examples, the proppant can be sand, bauxite, ceramic materials, glass materials, polymer materials, tetrafluoroethylene materials (e.g., "TEFLON™," and available from DuPont), nut shell materials, seed shell materials, fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some examples, the particulate material used can have a particle size in the range of from about 2 to about 400 mesh, U.S. Sieve Series. In some examples, the particulate material is graded sand having a particle size in the range of from about 10 to about 70 mesh, U.S. Sieve Series. In some examples, sand particle size distribution ranges are one or more of 10-20 mesh, 20-40 mesh, 40-60 mesh or 50-70 mesh, depending on the particle size and distribution of the formation particulates to be screened out by the particulate materials. The term "particulate," as used herein, includes all known shapes of materials including substantially spherical materials, fibrous materials, polygonal materials (such as cubic materials) and mixtures thereof. A proppant can have any suitable shape such as substantially spherical materials, fibrous materials, polygonal materials (such as cubic materials) and mixtures thereof.

Method of Curing a Curable Material

In various embodiments, the present invention provides a method of curing a curable material on a subterranean material. The curable material on the subterranean material can be on or in or contacting the subterranean material in any suitable way. The curable material can be any suitable curable material, such as a resin, a curable monomer, oligomer, or polymer, such that the curable material can cure from a liquid or semi-liquid state to a solid state. The method can include curing the curable material, wherein during the curing of the curable material the method further includes increasing the viscosity, yield shear strength, or combination thereof of the ER or MR fluid before or during the contacting of the fluid and the subterranean formation using an electric field, a magnetic field, or a combination thereof. The contacting can include any suitable downhole contacting of the ER or MR fluid and a mixture of a curable material and a subterranean material.

The viscosity or yield shear strength of the ER or MR fluid can be increased while the ER or MR fluid is in the presence of or surrounding the mixture of the curable material and the subterranean material. In some examples, the higher viscosity or higher yield shear strength holds the mixture of the curable material and the subterranean material in place such that the mixture can cure in the position held. In some embodiments, the electrical field or magnetic field can cure the curable material or can contribute to curing. In some embodiments, heat, pressure, time, a radiation source, or any combination thereof can cause the curing of the curable material. The heat or pressure can be heat or pressure naturally present downhole or the heat or pressure can be induced via means introduced from above the surface. The radiation source can be any suitable radiation source; for example, the radiation source can be a source of at least one of visible light, infrared light, microwaves, radio waves, very low frequency waves, extremely low frequency waves, thermal radiation (heat), and black-body radiation.

In some embodiments, the curable material can be present on the subterranean material prior to contacting the subterranean material and the ER or MR fluid. In some embodiments, the curable material is a payload in the ER or MR fluid and is delivered to the subterranean material using the ER or MR fluid. Curable material-payloads can be encapsulated curable materials; for example, the curable material can be encapsulated in material designed to rupture in the presence of particular amounts of heat, pressure, electric field, magnetic field, vibration, or other stimulus, such as an encapsulated resin. Curable material-payloads can be suspended droplets of resin or other curable materials, or materials that react to form a resin or other curable material downhole. Curable material-payloads can be coated on solid materials, such as a coated proppant.

In various embodiments, the viscosity or yield shear strength of the ER or MR fluid is increased to minimize settling of proppant aggregates while allowing curable material-treated proppant aggregates such as resin-treated proppant aggregates to cure and consolidate, for example forming proppant pillars, such as in a channel fracturing processes.

Resins can include any resin that is capable of forming a hardened, consolidated mass. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins, generally require a time-delayed catalyst or an external catalyst to help activate the polymerization of the resins if the cure temperature is low (e.g., less than 250° F.) but will cure under the effect of time and temperature if the formation temperature is above about 250° F., or above about 300° F.

Selection of a suitable resin may be affected by the temperature of the subterranean formation. By way of example, for subterranean formations having a bottom hole static temperature ("BHST") ranging from about 60° F. to about 250° F., two component epoxy based resins including a hardenable resin component and a hardening agent component containing specific hardening agents can be used. For subterranean formations having a BHST ranging from about 300° F. to about 600° F., a furan-based resin can be used. For subterranean formations having a BHST ranging from about 200° F. to about 400° F., a phenolic based resin or a one component HT epoxy based resin can be suitable. For subterranean formations having a BHST of at least about 175° F., a phenol/phenol formaldehyde/furfuryl alcohol resin may also be suitable.

Composition for Treatment of a Subterranean Formation.

In various embodiments, the present invention provides a composition for treatment of a subterranean formation. The composition includes the ER or MR fluid described herein. In some embodiments, the composition also includes at least one additional component, which can be any additional component for use in treating a subterranean formation. The additional component can be in any suitable form within the fluid, such as a suspension of a solid additional component, a mixture of a solid additional component and the fluid wherein the solid additional component is at least partially settled out of the composition, a liquid additional component solubilized or dispersed in the fluid, a suspension of a liquid additional component (e.g., an emulsion), a liquid additional component with the ER or MR fluid suspended therein (e.g., an emulsion), or any combination thereof. In some examples, the additional component can be a proppant, a resin-coated proppant, an encapsulated resin, a resin, Portland cement, pozzolana cement, gypsum cement, high alumina content cement, slag cement, silica cement, a cementitious kiln dust, fly ash, metakaolin, shale, zeolite, set retarding additive, surfactant, a gas, accelerators, weight reducing additives, heavyweight additives, lost circulation materials, filtration control additives, dispersants, crystalline silica compounds, amorphous silica, salts, fibers, hydratable clays, microspheres, pozzolan lime, thixotropic additives, water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof. In some embodiments, the additional component can be a proppant, a resin-coated proppant, an encapsulated resin, or a combination thereof.

EXAMPLES

The present invention can be better understood by reference to the following examples which are offered by way of illustration. The present invention is not limited to the examples given herein.

Example 1

Hypothetical Example

Figures 1, 2:
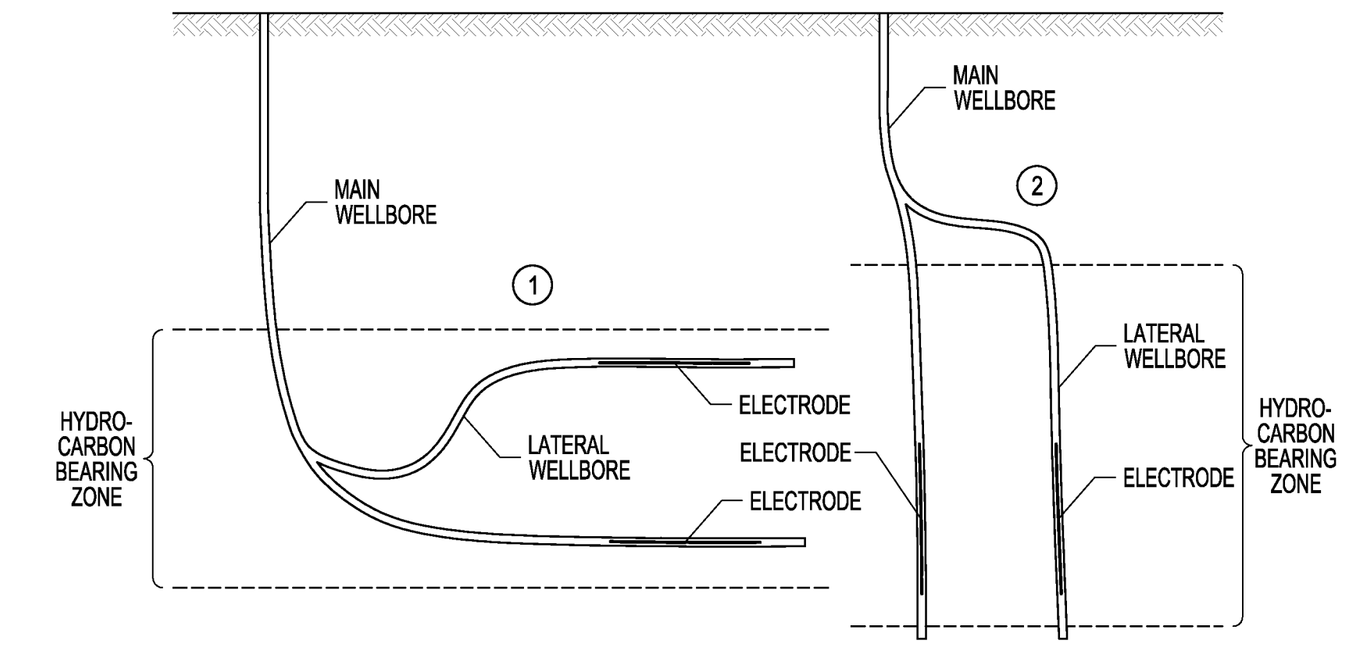
FIG. 1 illustrates a horizontal (left) or vertical (right) wellbore configuration, in accordance with various embodiments.

A lateral wellbore is drilled from and parallel to the main wellbore. Both wellbores extend into a hydrocarbon bearing zone and are in fluid communication therewith, as depicted in FIG. 1. FIG. 1 illustrates a horizontal (left, 1) or vertical (right, 2) wellbore configuration, each with a main wellbore and a corresponding parallel lateral wellbore. An electrode is installed in each wellbore. While injecting a fracturing fluid (prepared from an ER fluid) into the hydrocarbon bearing zone through the perforated interval of the main wellbore at flow rate to generate an effective pressure to create one or more fractures into the formation, an electric field is applied between the main and lateral wellbores to manipulate and enhance transport properties of the fracturing fluid. Hydrocarbons from the hydrocarbon bearing zone are recovered through the main wellbore production interval.

The following actions are performed:
1) Providing hydraulic fracturing fluids, either proppant-free or proppant-laden, that have been prepared with an ER fluid.
2) Providing a primary wellbore and a producing interval containing one or more perforated intervals.

3) Drilling a lateral wellbore from the existing primary wellbore, oriented parallel to the primary wellbore to reach similar measured depth and length that of producing interval in the primary wellbore (within the hydrocarbon bearing zone—both boreholes can to be on the same plane in the direction of minimum horizontal stress).
4) Installing an electrode in the primary wellbore extending into the perforated interval of the producing interval and an electrode in the lateral wellbore extending its perforated interval.
5) Isolating the perforated intervals in primary wellbore with packers for the hydraulic fracturing treatment.
6) Injecting the proppant-free ER fluid into the perforated interval in the primary wellbore at a flow rate to generate pressure to form at least fracture in the formation while applying an electric current from the electrode located in the primary wellbore to the electrode located in the lateral borehole.
7) Injecting the proppant-laden ER fluid into the perforated interval at a flow rate similar to that of the previous proppant-free fluid to place the proppant into the created fracture and extend the fracture length while applying an electric current from the electrode located in the primary wellbore to the electrode located in the lateral borehole.
8) Removing electric current to enhance flowback and recovery of ER fluid and putting the well on production.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a fluid that is electrorheological, magnetorheological, or a combination thereof; and contacting downhole a subterranean material and the electrorheological or magnetorheological fluid.

Embodiment 2 provides the method of Embodiment 1, wherein the fluid is at least electrorheological, further comprising placing at least two electrodes downhole.

Embodiment 3 provides the method of Embodiment 2, further comprising applying a potential across the at least two electrodes to alter viscosity, yield shear strength, or a combination thereof of the fluid downhole in at least one location.

Embodiment 4 provides the method of Embodiment 3, wherein the potential applied across the at least two electrodes generates an electric field at the location where the viscosity, yield shear strength, or combination thereof of the fluid is altered of about 1 V/mm-10,000,000 V/mm.

Embodiment 5 provides the method of Embodiments 1-4, wherein the fluid is at least magnetorheological, further comprising placing at least one electromagnet downhole.

Embodiment 6 provides the method of Embodiment 5, further comprising applying an electric current to the at least one electromagnet to alter the viscosity, yield shear strength, or combination thereof of the fluid downhole in at least one location.

Embodiment 7 provides the method of Embodiment 6, wherein the current applied to the at least one electromagnet generates a magnetic field at the location where the viscosity, yield shear strength, or combination thereof of the fluid is altered of about 0.01 kA/m-100,000 kA/m.

Embodiment 8 provides the method of Embodiments 1-7, wherein downhole comprises a main borehole.

Embodiment 9 provides the method of Embodiment 8, wherein the main borehole is proximate a production zone in at least one downhole location.

Embodiment 10 provides the method of Embodiment 9, further comprising placing at least two electrodes in the main borehole in the at least one downhole location proximate the production zone.

Embodiment 11 provides the method of Embodiments 9-10, further comprising placing at least one electromagnet in the main borehole in the at least one downhole location proximate the production zone.

Embodiment 12 provides the method of Embodiments 8-11, further comprising forming the main borehole.

Embodiment 13 provides the method of Embodiments 8-12, wherein downhole comprises at least one secondary borehole, and wherein in at least one downhole location the secondary borehole is proximate both the main borehole and a production zone.

Embodiment 14 provides the method of Embodiment 13, further comprising forming the secondary borehole.

Embodiment 15 provides the method of Embodiments 13-14, wherein at least one of the main borehole and the secondary borehole is in the production zone.

Embodiment 16 provides the method of Embodiments 13-15, wherein both of the main borehole and the secondary borehole are in the production zone.

Embodiment 17 provides the method of Embodiments 13-16, wherein the secondary borehole begins at the surface.

Embodiment 18 provides the method of Embodiments 13-17, wherein the secondary borehole is a lateral borehole and begins downhole in the main borehole.

Embodiment 19 provides the method of Embodiments 13-18, wherein in the at least one downhole location wherein the secondary borehole is proximate both the main borehole and the production zone, the secondary borehole is substantially parallel to the main borehole.

Embodiment 20 provides the method of Embodiments 13-19, wherein in the at least one downhole location wherein the secondary borehole is proximate both the main borehole and the production zone, the secondary borehole is substantially perpendicular to the main borehole.

Embodiment 21 provides the method of Embodiments 13-20, further comprising placing at least one electrode in the main borehole at a location proximate the production zone, and placing at least one electrode in the secondary borehole at a location proximate the production zone.

Embodiment 22 provides the method of Embodiments 13-21, further comprising placing at least one electromagnet in the main borehole at a location proximate the production zone, placing at least one electromagnet in the secondary borehole in the location proximate the production zone, or a combination thereof.

Embodiment 23 provides the method of Embodiments 1-22, comprising fracturing at least part of the subterranean material to form at least one subterranean fracture.

Embodiment 24 provides the method of Embodiment 23, wherein the electrorheological or magnetorheological fluid is used to perform at least part of the fracturing.

Embodiment 25 provides the method of Embodiment 24, wherein before or during the fracturing, the viscosity, yield shear strength, or combination thereof of the electrorheological or magnetorheological fluid is increased downhole in at least one location using an electric field, a magnetic field, or a combination thereof.

Embodiment 26 provides the method of Embodiments 24-25, further comprising after the fracturing recovering at least part of the electrorheological or magnetorheological fluid used for the fracturing.

Embodiment 27 provides the method of Embodiment 26, wherein before or during the recovering of the electrorheological or magnetorheological fluid used for the fracturing, the viscosity, yield shear strength, or combination thereof of the electrorheological or magnetorheological fluid is decreased downhole in at least one location by decreasing the intensity of the electric field, magnetic field, or combination thereof.

Embodiment 28 provides the method of Embodiments 24-27, wherein the electrorheological or magnetorheological fluid used to perform at least part of the fracturing comprises a proppant, a resin-coated proppant, an encapsulated resin, or a combination thereof.

Embodiment 29 provides the method of Embodiments 23-28, wherein the fracturing is performed before the electrorheological or magnetorheological fluid is contacted with the subterranean material.

Embodiment 30 provides the method of Embodiments 1-29, wherein the fluid comprises a payload material.

Embodiment 31 provides the method of Embodiment 30, further comprising fracturing the subterranean material using at least part of the electrorheological or magnetorheological fluid.

Embodiment 32 provides the method of Embodiments 30-31, further comprising using the electrorheological or magnetorheological fluid to deposit at least part of the payload material downhole.

Embodiment 33 provides the method of Embodiment 32, wherein the at least part of the payload material is deposited in a subterranean fracture.

Embodiment 34 provides the method of Embodiments 32-33, wherein before or during the depositing, the viscosity, yield shear strength, or combination thereof of the electrorheological or magnetorheological fluid is increased downhole in at least one location using an electric field, a magnetic field, or a combination thereof.

Embodiment 35 provides the method of Embodiment 34, wherein during or after the depositing, the viscosity, yield shear strength, or combination thereof of the electrorheological or magnetorheological fluid is decreased downhole in at least one location by decreasing the intensity of the electric field, magnetic field, or combination thereof.

Embodiment 36 provides the method of Embodiments 32-35, further comprising after the depositing of the payload material recovering at least part of the electrorheological or magnetorheological fluid used for the depositing of the payload material.

Embodiment 37 provides the method of Embodiment 36, wherein before or during the recovering, the viscosity, yield shear strength, or combination thereof of the electrorheological or magnetorheological fluid is decreased downhole in at least one location by decreasing the intensity of the electric field, magnetic field, or combination thereof.

Embodiment 38 provides the method of Embodiments 30-37, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 39 provides the method of Embodiments 30-38, wherein the payload material comprises a proppant, a resin-coated proppant, or an encapsulated resin.

Embodiment 40 provides the method of Embodiments 1-39, wherein the electrorheological or magnetorheological fluid comprises water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 41 provides the method of Embodiments 1-40, wherein the subterranean material comprises a curable material, wherein the method further comprises curing the curable material, wherein during the curing of the curable material the method further comprises increasing the viscosity, yield shear strength, or combination thereof of the electrorheological or magnetorheological fluid before or during the contacting using an electric field, a magnetic field, or a combination thereof.

Embodiment 42 provides the method of Embodiment 41, further comprising at least partially curing the curable material using a downhole source of radiation.

Embodiment 43 provides the method of Embodiments 41-42 wherein prior to curing the curable material, the electrorheological or magnetorheological fluid comprises the curable material as a payload.

Embodiment 44 provides the method of Embodiments 1-43, wherein the fluid is electrorheological and comprises a suspension of substantially non-conducting particles and a substantially electrically-insulating fluid.

Embodiment 45 provides the method of Embodiment 44, wherein the non-conducting particles comprise a polymer, a block copolymer, a polysiloxane, a mineral, a polyelectrolyte, a nanoparticle, a ceramic, or a combination thereof.

Embodiment 46 provides the method of Embodiments 44-45, wherein the electrically insulating fluid comprises a pump oil, a silicone oil, a mineral oil, a paraffin oil, a chlorinated paraffin oil, a hydrocarbon oil, an engine oil, or a combination thereof.

Embodiment 47 provides the method of Embodiments 44-46, wherein non-conducting particles have an average diameter of about 0.01-1000 μm.

Embodiment 48 provides the method of Embodiments 44-47, wherein the non-conducting particles are about 0.001-60 wt % of the electrorheological fluid.

Embodiment 49 provides the method of Embodiments 44-48, wherein the average change in yield shear strength of the electrorheological fluid per change in local electric field is about 0.001-1,000,000 Pa per 1 V/mm.

Embodiment 50 provides the method of Embodiments 1-49, wherein the fluid is magnetorheological and comprises a suspension of magnetizable particles and a carrier liquid.

Embodiment 51 provides the method of Embodiment 50, wherein the magnetizable particles comprise at least one of a pure metal, a metal alloy, a metal compound, and a magnetically soft material, comprising at least one of iron, nickel, cobalt, chrome, vanadium, tungsten, copper, and manganese.

Embodiment 52 provides the method of Embodiments 50-51, wherein the carrier liquid comprises a mineral oil, a hydrocarbon oil, water, a silicone oil, an esterified fatty acid, an organic liquid, a solvent, or a combination thereof.

Embodiment 53 provides the method of Embodiments 50-52, wherein the magnetizable particles have an average diameter of about 0.001-10,000 μm.

Embodiment 54 provides the method of Embodiments 50-53, wherein the magnetizable particles are about 0.1-99.9 wt % of the magnetorheological fluid.

Embodiment 55 provides the method of Embodiments 50-54, wherein the average change in yield shear strength of the magnetorheological fluid per change in the local electric field is about 0.001-1,000,000 Pa per 1 kA/m.

Embodiment 56 provides a method of fracturing a subterranean material, comprising: obtaining or providing a fluid that is electrorheological, magnetorheological, or a combination thereof; contacting downhole a subterranean material and the electrorheological or magnetorheological fluid; and fracturing at least part of the subterranean material using the electrorheological or magnetorheological fluid, wherein before or during the fracturing, the viscosity, yield shear strength, or combination thereof of the electrorheological or magnetorheological fluid is increased downhole proximate the at least part of the subterranean material using an electric field, a magnetic field, or a combination thereof.

Embodiment 57 provides a method of depositing a payload material into a subterranean fracture, comprising: obtaining or providing a fluid that is electrorheological, magnetorheological, or a combination thereof; contacting downhole a subterranean material and the electrorheological or magnetorheological fluid, wherein the fluid comprises a payload material comprising at least one of a proppant, a resin-coated proppant, and an encapsulated resin; using the electrorheological or magnetorheological fluid to deposit at least part of the payload material downhole in a subterranean fracture, wherein before or during the depositing, the viscosity, yield shear strength, or combination thereof of the electrorheological or magnetorheological fluid is increased downhole proximate the subterranean fracture using an electric field, a magnetic field, or a combination thereof; and recovering at least part of the electrorheological or magnetorheological fluid used for the depositing of the payload material, wherein before or during the recovering, the viscosity, yield shear strength, or combination thereof of the electrorheological or magnetorheological fluid is decreased downhole in at least one location by decreasing the intensity of the electric field, magnetic field, or combination thereof.

Embodiment 58 provides a method of curing a curable material on a subterranean material, comprising: obtaining or providing a fluid that is electrorheological, magnetorheological, or a combination thereof; contacting downhole a subterranean material and the electrorheological or magnetorheological fluid, wherein the subterranean material comprises a curable material; curing the curable material while increasing the viscosity, yield shear strength, or combination thereof of the electrorheological or magnetorheological fluid before or during the contacting using an electric field, a magnetic field, or a combination thereof.

Embodiment 59 provides a method of treating a subterranean formation, the method comprising: obtaining or providing a main borehole; forming a secondary borehole that is a lateral borehole and begins downhole in the main borehole, wherein in at least one downhole location the secondary borehole is proximate to both the main borehole and a production zone; placing at least one electrode in the main borehole at a location proximate the production zone, and placing at least one electrode in the secondary borehole at a location proximate the production zone; obtaining or providing a first fluid that is electrorheological, magnetorheological, or a combination thereof; fracturing at least part of the subterranean material using the first electrorheological or magnetorheological fluid to form at least one subterranean fracture, wherein before or during the fracturing, the viscosity, yield shear strength, or combination thereof of the first electrorheological or magnetorheological fluid is increased downhole proximate the at least part of the subterranean material using at least a first electric field generated by the at least two electrodes; obtaining or providing a second fluid that is electrorheological, magnetorheological, or a combination thereof, wherein the fluid comprises a payload material comprising at least one of a proppant, a resin-coated proppant, and an encapsulated resin; using the second fluid to deposit at least part of the payload material downhole in the subterranean fracture, wherein before or during the depositing, the viscosity, yield shear strength, or combination thereof of the electrorheological or magnetorheological fluid is increased downhole proximate the subterranean fracture using at least a second electric field generated by the at least two electrodes; and recovering at least part of the first or second fluid, wherein before or during the recovering, the viscosity, yield shear strength, or combination thereof of the electrorheological or magnetorheological fluid is decreased downhole in at least one location by decreasing at least the second electric field generated by the at least two electrodes.

Embodiment 60 provides a composition for treatment of a subterranean formation, the composition comprising: an electrorheological or magnetorheological fluid comprising a proppant, a resin-coated proppant, an encapsulated resin, or a combination thereof.

Embodiment 61 provides the apparatus or method of any one or any combination of Embodiments 1-60 optionally configured such that all elements or options recited are available to use or select from.

What is claimed is:

1. A method of treating a subterranean formation, the method comprising:
   placing in the subterranean formation a fluid that is electrorheological, magnetorheological, or a combination thereof, wherein the fluid comprises a payload material comprising a curable material;
   increasing the viscosity, yield shear strength, or a combination thereof of the electrorheological or magnetorheological fluid using an electric field, a magnetic field, or a combination thereof; and
   curing the curable material.

2. The method of claim 1, wherein the fluid is at least electrorheological, further comprising placing at least two electrodes downhole and applying a potential across the at least two electrodes to alter viscosity, yield shear strength, or a combination thereof of the fluid downhole in at least one location.

3. The method of claim 2, wherein the potential applied across the at least two electrodes generates an electric field at the location where the viscosity, yield shear strength, or combination thereof of the fluid is altered of about 1 V/mm-about 10,000,000 V/mm.

4. The method of claim 1, wherein the fluid is at least magnetorheological, further comprising placing at least one electromagnet downhole and applying an electric current to the at least one electromagnet to alter the viscosity, yield shear strength, or combination thereof of the fluid downhole in at least one location.

5. The method of claim 4, wherein the current applied to the at least one electromagnet generates a magnetic field at the location where the viscosity, yield shear strength, or combination thereof of the fluid is altered of about 0.01 kA/m-about 100,000 kA/m.

6. The method of claim 1, wherein downhole comprises a main borehole, wherein the main borehole is proximate a production zone in at least one downhole location.

7. The method of claim 6, wherein downhole comprises at least one secondary borehole, and wherein in at least one downhole location the secondary borehole is proximate both the main borehole and a production zone.

8. The method of claim 7, further comprising:
a) placing at least one electrode in the main borehole at a location proximate the production zone, and placing at least one electrode in the secondary borehole at a location proximate the production zone;
b) placing at least one electromagnet in the main borehole at a location proximate the production zone, placing at least one electromagnet in the secondary borehole in the location proximate the production zone, or a combination thereof; or
c) a combination thereof.

9. The method of claim 1, comprising fracturing at least part of the subterranean formation to form at least one subterranean fracture.

10. The method of claim 9, wherein the electrorheological or magnetorheological fluid is used to perform at least part of the fracturing.

11. The method of claim 10, wherein before or during the fracturing, the viscosity, yield shear strength, or combination thereof of the electrorheological or magnetorheological fluid is increased downhole in at least one location using an electric field, a magnetic field, or a combination thereof.

12. The method of claim 10, further comprising after the fracturing recovering at least part of the electrorheological or magnetorheological fluid used for the fracturing.

13. The method of claim 12, wherein before or during the recovering of the electrorheological or magnetorheological fluid used for the fracturing, the viscosity, yield shear strength, or combination thereof of the electrorheological or magnetorheological fluid is decreased downhole in at least one location by decreasing the intensity of the electric field, magnetic field, or combination thereof.

14. The method of claim 1, wherein the fluid comprises a payload material.

15. The method of claim 14, further comprising fracturing the subterranean formation using at least part of the electrorheological or magnetorheological fluid.

16. The method of claim 14, further comprising using the electrorheological or magnetorheological fluid to deposit at least part of the payload material downhole.

17. The method of claim 16, wherein the at least part of the payload material is deposited in a subterranean fracture.

18. The method of claim 16, wherein before or during the depositing, the viscosity, yield shear strength, or combination thereof of the electrorheological or magnetorheological fluid is increased downhole in at least one location using an electric field, a magnetic field, or a combination thereof.

19. The method of claim 16, further comprising after the depositing of the payload material recovering at least part of the electrorheological or magnetorheological fluid used for the depositing of the payload material.

20. The method of claim 19, wherein before or during the recovering, the viscosity, yield shear strength, or combination thereof of the electrorheological or magnetorheological fluid is decreased downhole in at least one location by decreasing the intensity of the electric field, magnetic field, or combination thereof.

21. The method of claim 14, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

22. The method of claim 1, wherein the electrorheological or magnetorheological fluid comprises water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

23. The method of claim 1, wherein the increasing of the viscosity, yield shear strength, of a combination thereof of the fluid occurs during the curing of the curable material.

24. The method of claim 1, wherein the curing comprises at least partially curing the curable material using a downhole source of radiation.

25. A method of fracturing a subterranean formation, comprising:
placing in the subterranean formation a fluid that is electrorheological, magnetorheological, or a combination thereof, wherein the fluid comprises a payload material comprising a curable material;
fracturing at least part of the subterranean material using the electrorheological or magnetorheological fluid, wherein before or during the fracturing, the viscosity, yield shear strength, or combination thereof of the electrorheological or magnetorheological fluid is increased downhole proximate the at least part of the subterranean material using an electric field, a magnetic field, or a combination thereof; and
curing the curable material.

26. A method of depositing a payload material into a subterranean fracture, comprising:

placing in a subterranean formation a fluid that is electrorheological or a combination thereof, wherein the fluid comprises a payload material comprising a curable material and at least one of a proppant, a resin-coated proppant, and an encapsulated resin;

using the electrorheological or magnetorheological fluid to deposit at least part of the payload material downhole in a subterranean fracture, wherein before or during the depositing, the viscosity, yield shear strength, or combination thereof of the electrorheological or magnetorheological fluid is increased downhole proximate the subterranean fracture using an electric field, a magnetic field, or a combination thereof;

curing the curable material; and recovering at least part of the electrorheological or magnetorheological fluid used for the depositing of the payload material, wherein before or during the recovering, the viscosity, yield shear strength, or combination thereof of the electrorheological or magnetorheological fluid is decreased downhole in at least one location by decreasing the intensity of the electric field, magnetic field, or combination thereof.

27. A method of curing a curable material on a subterranean material, comprising:

obtaining or providing a fluid that is electrorheological, magnetorheological, or a combination thereof, wherein the fluid comprises a payload comprising a curable material;

contacting downhole a subterranean material and the electrorheological or magnetorheological fluid such that the subterranean material comprises the curable material;

curing the curable material while, before or during the contacting, increasing the viscosity, yield shear strength, or a combination thereof of the electrorheological or magnetorheological fluid using an electric field, a magnetic field, or a combination thereof.

* * * * *